United States Patent [19]
Vassiliadis et al.

[11] Patent Number: 5,140,545
[45] Date of Patent: Aug. 18, 1992

[54] HIGH PERFORMANCE DIVIDER WITH A SEQUENCE OF CONVERGENCE FACTORS

[75] Inventors: Stamatis Vassiliadis, Vestal; Josephine A. Boston, Wappingers Falls, both of N.Y.

[73] Assignee: International Business Machines Corporation, Armonk, N.Y.

[21] Appl. No.: 655,316

[22] Filed: Feb. 13, 1991

[51] Int. Cl.⁵ .............................................. G06F 7/52
[52] U.S. Cl. .................................................... 364/765
[58] Field of Search ............... 364/765, 761, 764, 766, 364/767

[56] References Cited

U.S. PATENT DOCUMENTS

| | | | |
|---|---|---|---|
| 4,707,798 | 11/1987 | Nakano | 364/765 |
| 4,797,849 | 1/1989 | Nakano | 364/765 |
| 4,991,132 | 2/1991 | Kadota | 364/765 |
| 5,046,038 | 9/1991 | Briggs et al. | 364/765 |
| 5,065,352 | 11/1991 | Nakano | 364/765 |

OTHER PUBLICATIONS

"Computer Arithmetic", K. Hwang. J. Wiley & Sons. Inc. (1979), Chapter 7, pp. 213-238.
IBM Journal, Jan. 1967, "The IBM System/360 Model 91: Floating-Point Execution Unit", pp. 34-53.

*Primary Examiner*—Tan V. Mai
*Attorney, Agent, or Firm*—Baker, Maxham, Jester & Meador

[57] ABSTRACT

A system for dividing a digital dividend operand N by a digital divisor operand D to obtain a quotient operand Q with minimal execution time and hardware calculates a value $NP_0P_1 \ldots P_m$, where the value $P_0P_1 \ldots P_m$ has a magnitude such that $NP_0P_1 \ldots P_m$ converges to Q and $DP_0P_1$ converges to 1. The divider employs a one's complementation, multiplication and addition sequence to calculate the value $NP_0P_1 \ldots P_m$.

8 Claims, 4 Drawing Sheets

HIGH PERFORMANCE DIVIDER WITH A SEQUENCE OF CONVERGENCE FACTORS

BACKGROUND OF THE INVENTION

This invention relates to the division of digits using a fast multiplier and quadratic convergence, and more particularly, to an improved divider that employs a complementation, multiplication and addition sequence to achieve reduced execution time.

The division operation has been implemented in the past using conventional algorithms, i.e., algorithms that produce the quotient via successive additions/subtractions. A principal difficulty of such division operations is that their rate of convergence is linear. Each execution of the iterated procedure adds approximately the same number of bits to the quotient digits already determined. See, for example, K. Hwang, "*Computer Arithmetic*", J. Wiley & Sons, Inc. (1979). Such a family of algorithms produces slow division implementations or, when a faster divider is desired, requires prohibitive hardware.

A divide algorithm based on quadratic convergence has been designed for the System/360 Model 91 computer from International Business Machines Corporation, the assignee of the present application. This algorithm, which shall be referred to herein as the "IBM" method, has resulted in faster divide hardware, especially for technologies that allow the design of fast multipliers. See S.F. Anderson, et al, "*The IBM System/360 Model 91: Floating Point Execution Unit*", IBM Journal pp. 34-53 (January 1967). The overhead needed to implement such division with a fast multiplier is small, and the gain in performance has been comparable to traditional large-scale multipliers. Thus using quadratic algorithms to design dividers, both hardware and execution time can be saved when compared to the traditional algorithms that employ addition/subtraction. The actual savings are of large magnitudes.

The IBM quadratic convergence division algorithm may be developed by first considering the division operation:

$$Q = N/D$$

with Q being the quotient, N the dividend, and D the divisor. Assume that the quotient Q can be generated for the division, i.e., N < D and D ≠ 0. The division operation can be written as:

$$Q = \frac{N}{D} = \frac{NR_0R_1 \ldots R_n}{DR_0R_1 \ldots R_n}$$

If $R_k$ is found, for $0 \leq k \leq n$, such that the denominator $DR_0R_1 \ldots R_n$ converges to 1, then the quotient, Q, is equal to:

$$Q = NR_0R_1 \ldots R_n$$

Let N and D be two positive fractions and assume that N and D are normalized. It can be proven that the denominator $DR_0R_1 \ldots R_n$ approaches 1 if:

$$R_0 = 1 + \delta \text{ for } k=0$$

$$R_k = 1 + \delta^{2**k} = 2 - D_{k-1} \text{ for } k>0$$

$$D_k = 1 - \delta^{2**(k+1)} = DR_0R_1 \ldots R_k = D_{k-1}R_k$$

The convention "" will be used throughout this specification to indicate double exponentiation. Thus, by way of example, the expression "$x^{}y$" shall be understood to signify "$x^2$" to the "y" power, and so on.

It can further be proven with substitution of $R_0$, $R_k$ and $D_k$ that the quotient can be computed by:

$$Q = N(1-\delta)(1+\delta^2)(1+\delta^4) \ldots (1+\delta^{2**n})$$

For example, consider a 56 bit fraction. Given that D is bit normalized, i.e., of the form 0.1***...*, with * representing either 0 or 1, it's value is between $\frac{1}{2} \leq D < 1$ and D can be written as:

$$D = 1 - \delta, \text{ where } 0 \leq \delta \leq \frac{1}{2}$$

The IBM quadratic convergence algorithm states the following:

1. For the first iteration:

$$R_0 = 1 + \delta = 2 - D$$

As shown in Appendix A hereto, $R_0$ is obtained by two's complementation of the divisor D.

The value $D_0$ is determined by multiplying D by its two's complement $R_0$ to obtain:

$$D_0 = DR_0 = (1-\delta)(1-\delta) = 1 - \delta^2$$

Since D is bit normalized, and $\delta \leq \frac{1}{2}$, it can be stated that $\delta^2 \leq \frac{1}{4}$ and $DR_0 \leq \frac{3}{4}$, which implies that $DR_0$ is of the form 0.11**...

2. For the second iteration:

$$R_1 = 1 + \delta^2 = 2 - D_0$$

Again, $R_1$ is found by two's complementation of the value $D_0$ calculated above.

The value $R_1$ is multiplied by its two's complement $D_0$ to obtain the next iteration of $D_k$:

$$D_1 = DR_0R_1 = D_0R_1 = (1-\delta^2)(1+\delta^2) = 1 - \delta^4$$

The implication is that $DR_0R_1$ is of the form 0.1111***...*.

Successive iterations are similarly carried out. Each iteration will double the leading ones and $DR_0R_1 \ldots R_n$ will converge to 0.111...11, where there are 56 ones following the binary point (i.e., it will converge to 1).

Given that the first iteration produces two leading 1's, the second iteration four leading 1's, etc. . . . , to converge 56 bits, six iterations will be needed. That is six iterations will produce, $$DR_0R_1R_2R_3R_4R_5 = 0.111\ldots11 - 1$$

where there are 56 ones following the binary point. To produce the quotient:

$$Q = NR_0R_1R_2R_3R_4R_5$$
$$= N(1 + \delta)(1 + \delta^2)(1 + \delta^4)(1 + \delta^8)(1 + \delta^{16})(1 + \delta^{32})$$

it might appear that six more multiplications will be needed in addition to the six multiplications needed to converge the denominator to 1.

However, it is noted that:
$$R_k = 1 + \delta^{2k} \text{ and } D_{k-1} = 1 - \delta^{2k}, k \leq 1$$

$$R_k = 2 - D_{k-1}$$

The implication of the previous statement is that while 6 multiplications are needed to converge the denominator to 1, the last multiplication will produce $D_k$ (with k=5) which is not required for the quotient. Thus, such a multiplication need not be performed. Referring to FIG. 1, this means that step 12 of the operation may be eliminated because only $DR_0R_1R_2R_3R_4$, and not $DR_0R_1R_2R_3R_4R_5$, is required to compute the quotient Q. Consequently, in order to produce the quotient, eleven multiplications are required with two's complementation to create the desired result. However, as will be discussed in the "Comparison" section below, because of date dependency interlocks, eleven multiplications may not produce a faster divider.

It will also be appreciated that the cycle time of the divider is related to the speed of the multiplier. It is assumed that the multiplier is designed in a parallel fashion for high speed execution.

Notwithstanding the significant reduction in execution duration achievable with the IBM divider as compared to dividers employing linear convergence methods, additional reductions in execution cycle requirements would be desirable. It would be further advantageous to provide a divider utilizing less overhead hardware than previous efforts. For example, obviation of the two's complementation hardware, required for implementation of the prior art IBM divider would offer advantages of hardware simplification and cost reduction.

SUMMARY OF THE INVENTION

The foregoing objectives and advantages are achieved by the invention, in which there is provided a fast divider and a proposed hardware implementation thereof employing a fast multiplier which results in improved execution time for the division when compared to traditional dividers and previously proposed quadratic convergence methods.

It is therefore an object and advantage of the present invention is to improve execution time for a divider without the addition of cost prohibitive hardware.

It is a further object and advantage of the present invention is to improve execution time for a divider using less overhead hardware when compared to previously proposed schemes, assuming the hardware of the multiplier is needed to perform multiplication instructions.

In accordance with the invention, an improved divider employing a fast multiplier performs a sequence of complementation, multiplication and addition operations in accordance with a novel quadratic convergence algorithm such that the divider rapidly converges to a desired quotient. In a binary implementation, the divider performs one's complementation followed by multiplication and addition. In a preferred hardware aspect, the divider is implemented with a 3/1 adder instead of a 2/1 adder as used in prior art quadratic convergence dividers. However, the present divider saves hardware by obviating the use of a dedicated two's complementer. Execution savings of at least one third of the cycles needed to perform the division for the present divider may be obtained when compared to the prior art IBM divider for operands which are 56 bits long.

BRIEF DESCRIPTION OF THE DRAWINGS

The objects, features and advantages of the present invention will be more fully appreciated from the detailed description of the preferred embodiment when considered in conjunction with the accompanying drawings in which.

DETAILED DESCRIPTION OF THE PREFERRED EMBODIMENT

Figure 1:
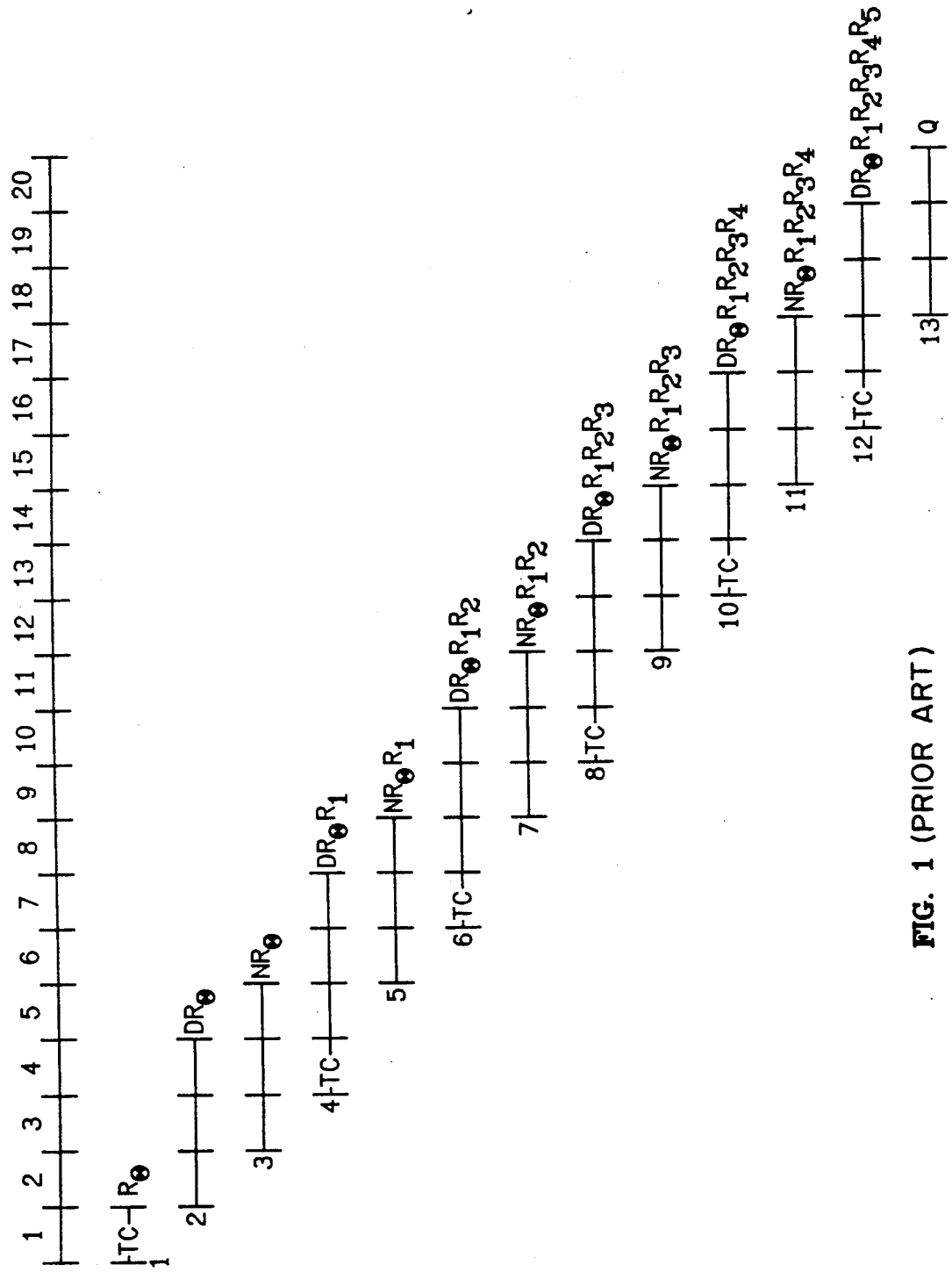
FIG. 1 is a diagrammatic illustration of a prior art pipeline execution sequence.

An improved divider employing a novel quadratic convergence algorithm may be developed as follows:

Assume fractional numbers and that the length of the operands is n. Consider the following recursive formula:

$$P_0 = 1 + \delta$$
$$D = 1 - \delta$$
$$P_k = 1 + \delta^{2**k}$$
$$D_k = 1 - \delta^{2**(k-1)}$$
$$= (1 - \delta^{2k})(1 - \delta^{21})$$
$$= DP_0P_1P_2 \ldots P_k$$
$$= D_{k-1}P_k$$

such that:
$$P_k = \Phi_k + 2^{-(n-1)}$$
Let
$$Q = \frac{N}{D} \cdot \frac{NP_0P_1 \ldots P_m}{DP_0P_1 \ldots P_m}$$

If N and D are positive and normalized, then the quadratic convergence algorithm indicates that:

$DP_0P_1 \ldots P_m$ will converge to 1 and $NP_0P_1 \ldots P_m$ will converge to Q It is noted that the algorithm proposed in the prior art IBM divider computes the $R_k$ terms with a two's complementation while the proposed recursive equation contains the term $P_k$ which requires an additional equation containing the $\phi_k$ term that must be computed.

Given that:

$$D_{k-1} = 1 - \delta^{2**k} \text{ and}$$
$$P_k = 1 + \delta^{2**k}$$
$$\delta^{2**k} = 1 - Dk - 1 \text{ and}$$
$$P_k = 2 - D_{k-1}$$
because by definition,
$$P_k = \Phi_k + 2^{-(n-1)}$$
$$\Phi_k = 2 - D_{k-1} - 2^{-(n-1)}$$

As shown in Appendix B, $\phi^k$ is the one's complement of $D_{k-1}$, and $$D_k = D_{k-1}P_k$$
$$= D_{k-1}(\Phi_k + 2^{-(n-1)})$$
$$= D_{k-1}\Phi_k + D_{k-1}2^{-(n-1)}$$

Given $D_{k-1}$ and $\phi_k$ in an iteration, a multiply-addition has to be performed to produce the $D_k$. Thus $DP_0P_1 \ldots P_m$ is achieved via multiply-additions rather than multiplications.

To clarify, consider the following example. Let the normalized D be equal to 0.1000, then the one's complement of D, $\phi_0 = 1.0111$ and $$
\begin{aligned}
D_0 &= DP_0 \\
&= D(\Phi_0 + 2^{-4}) \\
&= D\Phi_0 + D2^{-4} \\
&= (0.1000)(1.0111) + (0.000010000)
\end{aligned}
$$

```
 0.1000
 1.0111
 0.1000
 0.00000
 0.001000
 0.0001000
 0.00001000
 0.00001000
 0.11000000
``` and $D_0 = 0.11000000$ which is equal to $D_0 = DR_0$ as described in the prior art IBM divider because $D_O = D!D$ (!D = two's complement of D) and $D_0 = (0.1000)(1.1000)$

```
 0.1000
 1.1000
 0.1000
 0.01000
 0.000000
 0.0000000
 0.00000000
 0.11000000
```

Thus, $D_0$ computed in accordance with the prior art IBM divider 0.11000000 which is the same as the $D_0$ computed with the divider of the present invention. For the second iteration:

$$
\begin{aligned}
D_1 &= D_0 P_1 \\
&= D_0(\Phi_1 + 2^{-4}) \\
&= D_0 \Phi_1 + D_0 2^{-4}
\end{aligned}
$$

After truncation, $D_0 = 0.1100$ and because $\phi_1$ is the one's complement of $D_O$, $\phi_1 = 1.001$, Thus, $D_1 = (0.1100)(1.0011) + (0.00001100)$

```
 0.1100
 1.0011
 0.1100
 0.00000
 0.000000
 0.0001100
 0.00001100
 0.00001100
 0.11110000
```

Applying the scheme reported in the prior art IBM divider:

$$D_1 = D_0 R_1 = D_0!D_0$$
(!$D_0$ = two's complement of D)

after truncation, $D_0 = 0.1100$ and $D_1 = (0.1100)(1.0100)$.

```
 0.1100
 1.0100
 0.1100
 0.00000
 0.001100
 0.0000000
 0.00000000
 0.11110000
```

Thus, both schemes in this example will converge the divisor D to 0.1111 as required in two steps.

In addition, it can be stated that $$DP_0P_1 \ldots P_{hd\,m} = D(\phi_0 + 2^{-(n-1)})(\phi_1 + 2^{-(n-1)}) \ldots (\phi_m + 2^{-(n-1)})$$

with $\phi_i$ being the bit by bit inversion of $D_{i-1}$, i.e., the one's complement of $D_{i-1}$.

A similar conclusion can be drawn for production of the quotient. In essence, $$Q = N(\phi_0 + 2^{-(n-1)})(\phi_1 + 2^{-(n-1)}) \ldots (\phi_m + 2^{-(n-1)})$$

with $\phi_i$ being the one's complement of $D_{i-1}$ and (n-1) having a value equal to the number of bits following the binary point in the divisor operand. For a 56 bit fraction, the following holds true:
$DP_0P_1 \ldots$
$$P_m = D_{k-1}P_m = D(\phi_0 - 2^{-56})(\phi_1 - 2^{-56})(\phi_3 + 2^{-56}(\phi_4 - 2^{-56})(\phi_5 - 2^{-56})$$

and the quotient is equal to:
$$Q = N(\phi_0 - 2^{-56})(\phi_1 - 2^{-56})(\phi_2 - 2^{-56})(\phi_3 + 2^{-56})(\phi_4 - 2^{-56})(\phi_5 - 2^{-56})$$

Figure 3:
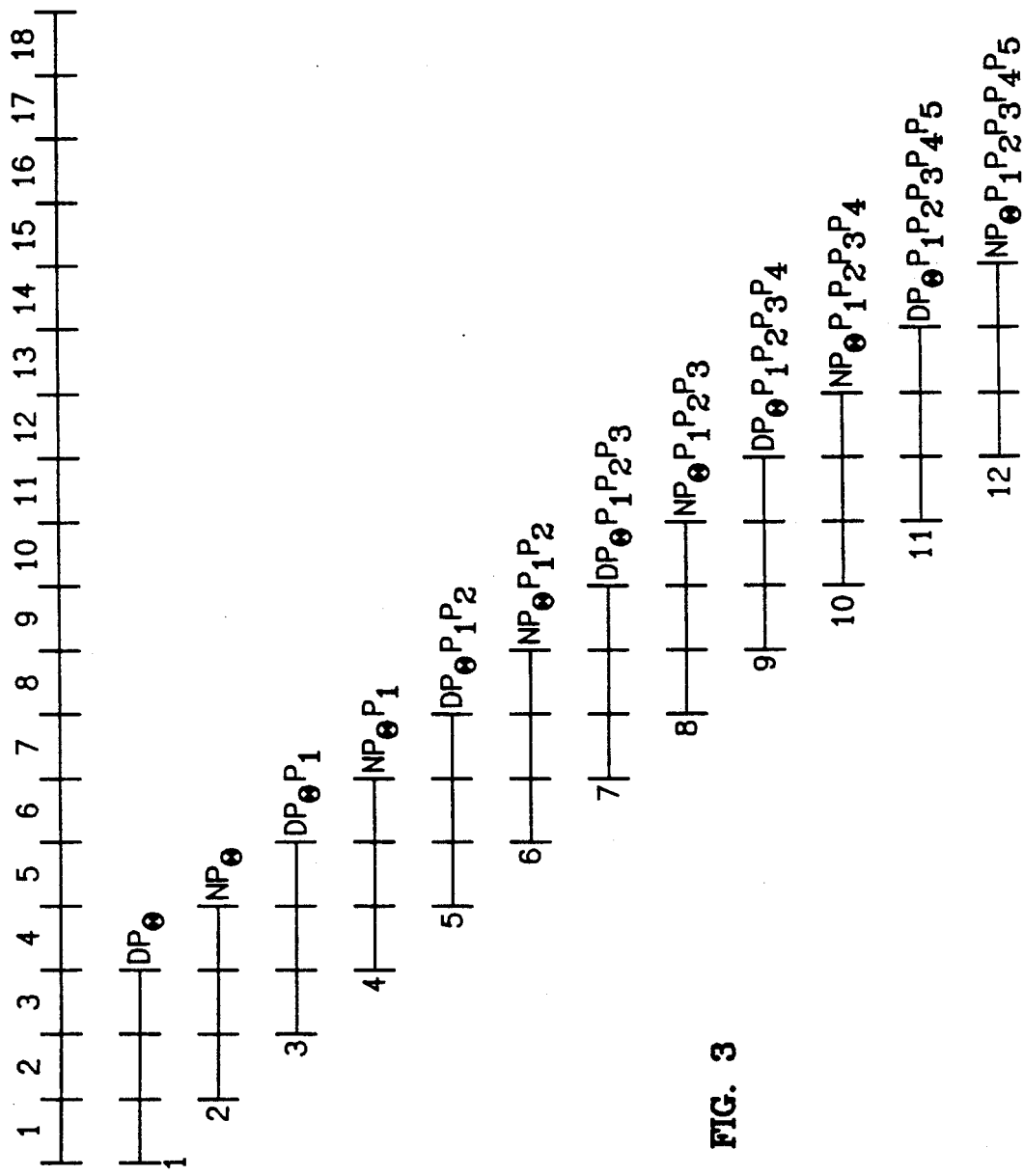
FIG. 3 is a diagrammatic illustration of a pipeline execution sequence for a divider constructed in accordance with the present invention.

FIG. 3 shows an execution sequence for successively deriving $DP_0P_1 \ldots P_m$ and $NP_0P_1 \ldots P_m$. As shown in that FIG., after proper preparation of the operands, the following must be computed to produce the quotient Q:
$$DP_0 = D(\phi_0 - 2^{-56}) = D\phi_0 + D2^{-56} \text{ and}$$
$$NP_0 = N\phi_0 + N2^{-56}$$

where $\phi_0$ is the one's complement of D.
$$DP_0P_1 = DP_0(\phi_1 + 2^{-56}) = DP_0\phi_1 - DP_02^{-56} \text{ and}$$
$$NP_0P_1 = NP_0\phi_1 + NP_02^{-56}$$

where $\phi_1$ is the one's complement of $DP_O$.
$$D_{P_0P_1P_2} = DP_0P_{12} + DP_0P_12^{-56} \text{ and}$$
$$NP_0P_1P_2 = NP_0P_1\phi_2 = NP_0P_12^{-56} - NP_0P_12^{-56}$$

where $\phi_2$ is the one's complement of $DP_0P_1$.

$$DP_0P_1P_2P_3 = DP_0P_1P_2\Phi_3 + DP_0P_1P_22^{-56} \qquad 4.$$

and $$NP_0P_1P_2P_3 = NP_0P_1P_2\Phi_3 + NP_0P_1P_22^{-56}$$

where $\phi_3$ is the one's complement and $DP_0P_1P_2$.

$$DP_0P_1P_2P_3P_4 = DP_0P_1P_2P_3\Phi_4 + DP_0P_1P_2P_32^{-56} \qquad 5.$$

and $$NP_0P_1P_2P_3P_4 = NP_0P_1P_2P_3\Phi_4 + NP_0P_1P_2P_32^{-56}$$

$\phi_4$ is the one's complement of $DP_0P_1P_2P_3$.
where
$$NP_0P_1P_2P_3P_4P_5 = NP_0P_1P_2P_3P_45 + NP_0PP_2P_3P_42^{-56}$$

where $\phi_5$ is the one's complement of $DP_0P_1P_2P_3P_4$.

As shown in FIG. 3, there will be twelve multiplication/addition operations requiring fourteen cycles to provide the quotient $NP_0P_1P_2P_3P_4P_5$. The sequence of FIG. 3 is discussed in more detail in the "Comparison" section below.

The formulation of the division as described above indicates that the prior art two's complement requirement to produce $R_k$ from $D_{k-1}$ has been substituted by a one's complement operation with the requirement that instead of just multiplying, a multiply and an addition must be performed.

In hardware design this may be translated to the deletion of the two's complementer (i.e., an incrementer of 56 bits) with the addition on the multiplication of a 3/1 adder instead of a 2/1 adder which implies the addition of a carry-save adder (CSA) for the 3/2 reduction. CSA's are conventionally known.

COMPARISON OF PROPOSED DIVIDER AND PRIOR ART METHOD

In general, quadratic convergence division algorithms are convenient, because they require multiplications, if and only if a fast multiplier is used for the division. With existing technologies, it is possible to design high speed multipliers and multiply-add functions that suggest the implementation of quadratic convergence division algorithms.

It is of interest to compare the quadratic convergence algorithm as described in the prior art with the proposed divider.

For ease of discussion, assume that the division is between two 56 bit numbers and assume the use of a 56×56 two cycle piped multiplier. Assume that such a multiplier produces a 112 bit result. Assume also, the use of a 3/1 adder instead of a 2/1 adder and proper bypassing logic to produce the final result. If the prior art scheme described above is applied, the pipeline charts shown in FIG. 1 will produce the quotient after the bit normalization and loading of D.

It can be observed that the multiplier requires a total of four cycles when no bypassing is used and that the two's complementer requires one cycle with appropriate bypassing. The explicit pipelining of the multiplier is as follows:

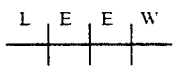

where L, E and W stand respectively for Load the multiplier (not shown in the pipeline diagrams), Execute the multiplication and Write the result.

Figure 2:
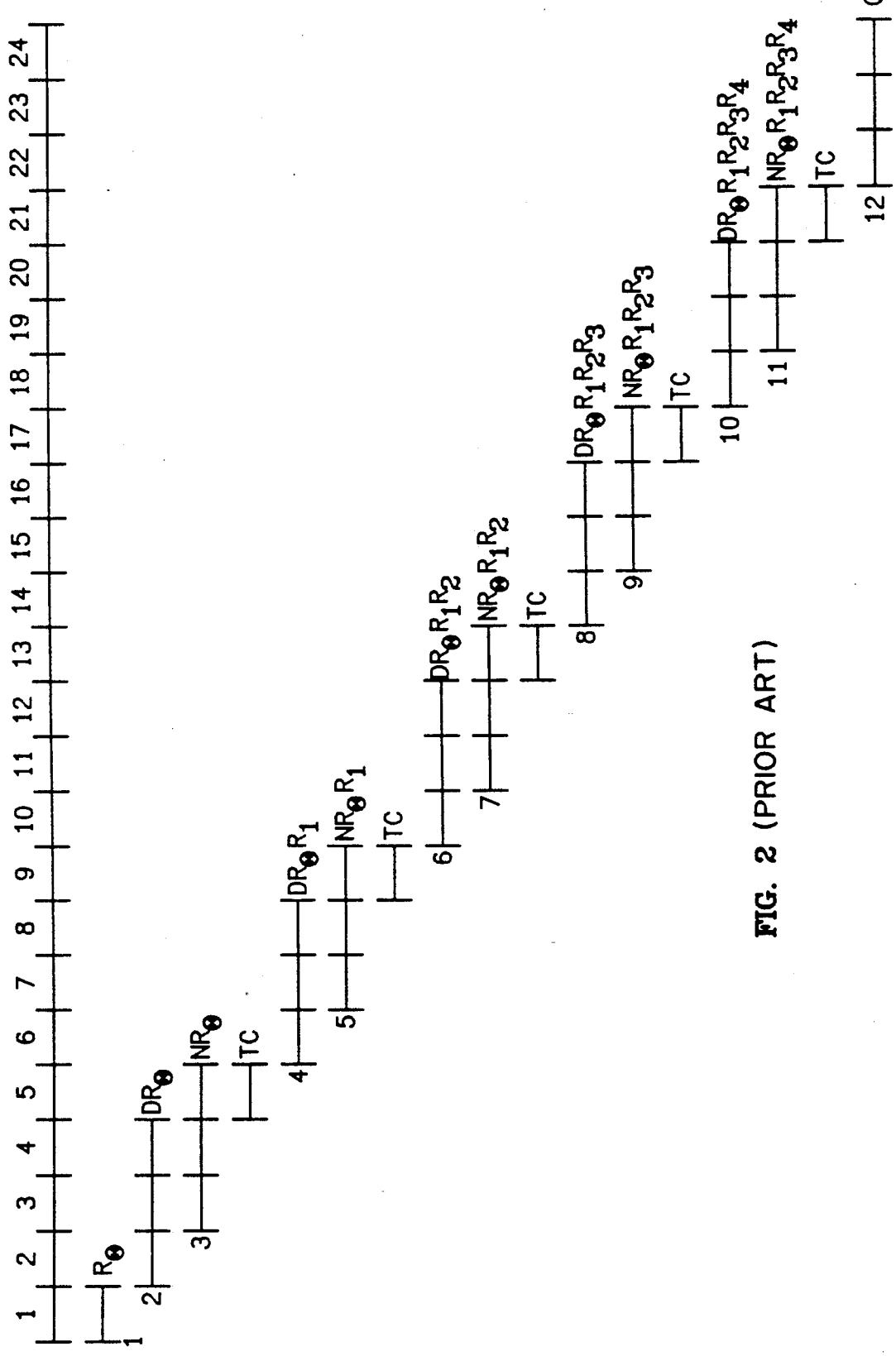
FIG. 2 is a diagrammatic illustration of another prior art pipeline execution sequence.

There are thirteen steps and twelve multiplications in the prior art diagram of FIG. 1. As previously discussed, it could be contended that the execution requires eleven multiplications rather than the twelve previously discussed. The reason the twelve multiplication algorithm is generally used is because if the eleven multiplication approach is chosen, the pipeline of FIG. 2 will result for the implementation. It is apparent from FIG. 2 that four extra cycles will be needed for the quotient production.

In any case (referring to FIG. 1), step 1 is required for the two's complementation of D. Steps 2, 4, 6, 8, 10 and 12 compute the term needed for the multiplications and steps 3, 5, 7, 9, 11, and 13 compute the quotient. It must be observed that this is the fastest possible execution and it is assumed there is bypassing of the load cycles (i.e., the L cycles of the pipelines are not shown on the diagrams). Also it must be observed that steps 4, 6, 8, 10, and 12 can not be initiated earlier because these steps need the result of the multiplier that produces the previous D, in two's complement form. The previous observation implies that steps 5, 7, 9, 11 and 13 also cannot be initiated earlier. Finally, it can be observed that the total number of cycles required for implementation of the prior art divider of FIG. 1 is twenty.

Referring now to FIG. 3, the divider of the present invention can produce a quotient in fourteen cycles. In FIG. 3, the load cycle (L) of the multiplier does not appear because it has been assumed that the result is bypassed as it has been assumed in the previous discussion of the prior art divider. It is also noted that because there is no need for two's complementation, step 1 can immediately begin with the execution. However, if it is not assumed that the normalized result is loaded (i.e., the normalizer is not on the same chip), then one extra cycle needs to be added for both implementations (i.e, the present invention and the prior art implementation), producing the quotient in fifteen and twenty one cycles, respectively. In any case, it will be apparent that the proposed algorithm is noticeably faster than the quadratic convergence algorithm reported in the prior art.

Figure 4:
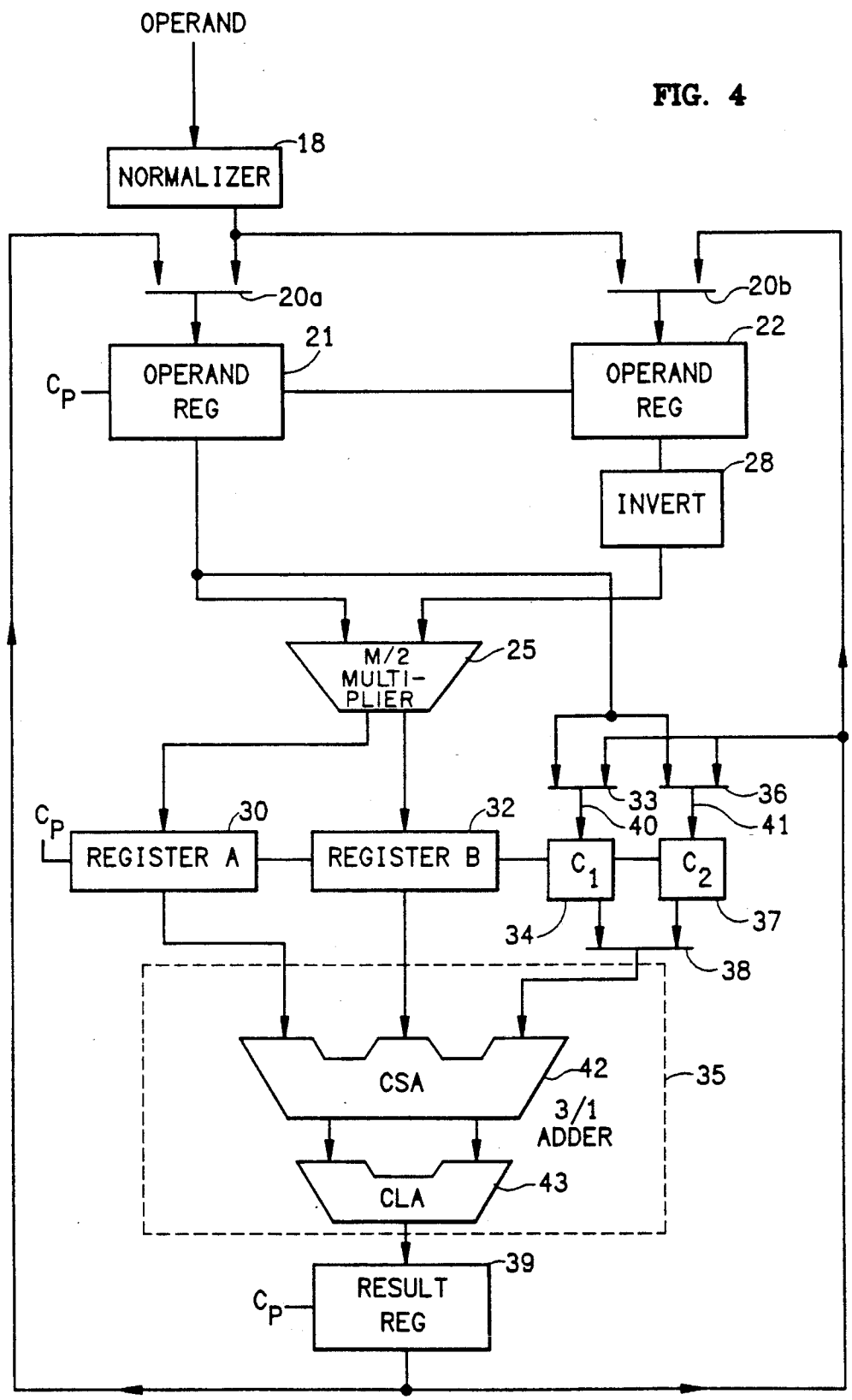
FIG. 4 is a schematic representation of a preferred hardware implementation of a divider constructed in accordance with the present invention.

A preferred hardware embodiment of the proposed divider is shown in FIG. 4. In FIG. 4, the operands of interest are normalized at 18 and directed through appropriate multiplexing hardware 20a and 20b to a pair of operand registers 21 and 22. The output of each operand register is provided to an M/2 multiplier 25, with the output of operand register 22 inverted at 28 to provide the one's complement of the operand in the register. Hereinafter, the register 21 is referred to as the "non-inverting" register, while the register 22 is referred to as the "inverting" register. The M/2 multiplier 25 produces partial products $PP_1$ and $PP_2$. (If a 2/1 adder followed the M/2 multiplier 25, receiving the partial products as operands, such an adder would produce a sum equal to the product of the two operands input to the M/2 multiplier.) These partial products are entered into a pair of registers, (register A) 30 and (register B) 32. These registers provide two of three inputs to a 3/1 adder 35. The third input to the 3/1 adder 35 is obtained from one of a pair of registers 34, 37 which provide right-shifted values for updated divisor and dividend terms. A first registration path is through a multiplexer 33 to a register 34. The multiplexer 33 selects either the contents of the register 21 or the result register 39 for entry into the register 34 (register $C_1$). A second registration path is through a multiplexer 36 and register 37. The multiplexer 36 receives as inputs either the contents of the non-inverting register 21 or the contents of the result register 39. The outputs of the registers 34 and 37 are input to a multiplexer 38 which selects the contents of one of the registers to provide as the third input for the 3/1 adder 35. The output from the 3/1 adder is provided to a result register 39. The output of the result register 39 and the output of the non-inverting register 21 are multiplexed to the input of the register 37 through a multiplexer 40.

A 3/1 adder is illustrated in FIG. 4. This adder 35 includes a carry-save adder (CSA) 41 which receives the three operands from the register 30, 32, and 37, combines them according to well-known principles, and produces carry (C) and save (S) outputs. The carry and save outputs of the CSA 41 are fed to the two inputs of a carry-lookahead adder (CLA) 43. The CLA 43 combines the C and S outputs according to well-known principles and produces a single output, which is provided to the result register 39. The single output from the CLA 43 is the sum of the three operands input to the CSA 41.

The connection between the result register 39 and the registers 21 and 22 is one-to-one. In this respect, the cells in register 37 connect to cells of identical significance in registers 21 and 22. However, respective hard-wired shifts 40,41 are provided in the connections between the outputs of the multiplexers 33 and 36 and the inputs of the register 34 and 37. These shift provides the required multiplication by $2^{-(n-1)}$ To obtain the successive values $DP_0P_1 \ldots P_m$ and $NP_0P_1 \ldots P_m$, the hardware implementation of FIG. 4 can be controlled to function in a manner corresponding to the iterative procedure of FIG. 3. To obtain the value $D_0 = DP_0 = D\phi_0 + D2^{-(n-1)}$ the hardware operates as follows: the normalized divisor operand D is placed in both registers 21 and 22 via the multiplexers 20a, 20b. The inverting operand register 22 inverts D to obtain its one's complement $\phi_0$. The operands D and $\phi_0$ are input to the M/2 multiplier 25 and the partial products representing the product $D\phi_0$ are stored in registers 30 and 32. Meanwhile, the operand D is gated through the multiplexer 33 into the register 34, with the result that the hardwiring 40 right-shifts the operand to obtain $D2^{-(n-1)}$, which is stored in register 34. The multiplexer 38 selects the output of the register 34 for provision as the third input to the 3/1 adder 35. The contents of the registers 30, 32, and 34 are input to the 3/1 adder to obtain the result $D\phi_0 + D2^{-(n-1)} = D_0$. This result is entered into the result register 39.

To obtain the value $NP_0 = N\phi_0 + N2^{-(n-1)}$ as $D_O$ is being calculated, the normalized numerator N is provided via the multiplexer 20a to the non-inverting operand register 21, while the normalized divisor D is retained in the inverting operand register 22. As above, the divisor D is inverted to provide its one's complement $\phi_0$. The operands N and $\phi_0$ are input to the M/2 multiplier 25 and the partial products representing the product $N\phi_0$ are placed in the registers 30 and 32. Meanwhile, the numerator operand N is right-shifted by the path 36, 41, 37 giving $N2^{-(n-1)}$ in register 37. The multiplexer 38 changes to select the contents of register 37. The contents of registers 30, 32, and 37 are input to the 3/1 adder and the result $N\phi_0 + N2^{-(n-1)} = NP_0$ is input to the result register 39.

While the result $NP_0$ is input to the result register 39, the previous result DP0 is fed from the result register 39 through the multiplexers 20a and 20b to the registers 21 and 22. This positions them to begin the calculation of $DP_0P_1$. At the same time, the multiplexers 33 and 36 are conditioned to select the output of the result register 39. These settings are maintained throughout the remaining operations.

Reference to FIG. 3 shows how the multiply-add process according to the invention is carried out by the embodiment of FIG. 4. It is contemplated that the divider of FIG. 4 would be implemented in a pipelined machine which would have a conventional pipeline clock $C_P$ available for register synchronization. This is illustrated in FIG. 3. In FIG. 3, 18 periods of the pipeline clock are illustrated. In 14 of these periods, 12 overlapped pipeline cycles for calculation of the updated divisor and quotient are shown. Each cycle has the basic form LEW, with the three phases of the cycle being performed in three successive periods at the pipeline clock. In this regard, L stands for loading the operand registers 21 and 22 in clock period i. In the calculation of an updated divisor, E stands for executing the multiplication-addition by entry of operands into the registers 30, 32, and 34 in clock period i+1; in the dividend update calculation, E stands for executing the multiplication-addition by entry of operands into the registers 30, 32, and 37 in clock period i+1. In all calculation cycles, W stands for writing the result into the register 39 in clock period i+2.

In executing the overlapped, iterative calculations for updated divisors and dividends, the apparatus of FIG. 4 is initialized by setting the multiplexer 20a and 20b to feed the normalized divisor operand D to the non-inverting and inverting registers in period 1 of FIG. 3, while in period 2, the multiplexers feed the normalized dividend N to the register 21 and divisor D to the register 22. In period 3, the multiplexers 20a and 20b are both set to select the output of the result register 39. Similarly, during period 1 (FIG. 3), the multiplexer 33 selects the output of the non-inverting register 21 for entry into the register 34, while during the first and second periods, the multiplexer 36 selects the output of the register 21 for entry into the register 37. Beginning with the third period of FIG. 3, both of the multiplexers 33 and 36 are set to select the output of the result register 39 for entry into their respective associated registers. The multiplexer 38 is operated to provide the contents of the registers 34 and 37 out of phase to the 3/1 adder 35 in such a manner that the shifted current divisor $DP_0P_1 \ldots P_{k-1}2^{-(n-1)}$ is available to the adder when the updated divisor $DP_0P_1 \ldots P_k$ is being calculated, while the shifted current dividend $NP_0P_1 \ldots P_{k-1}2^{-(n-1)}$ is made available through the register 37 when the updated dividend $NP_0P_1 \ldots P_k$ is being calculated by the adder 35.

Generally, if, during pipeline clock period m-1, the current divisor $DP_0P_1 \ldots P_{k-1}$ is being written to the result register 39, the LEW calculation cycle for calculating the updated divisor $DP_0P_1 \ldots Pk$ begins in pipeline clock period m. At this time, the non-inverting register 21 provides the value $DP_0P_1 \ldots P_{k-1}$ to one input of the multiplier, while the one's complement of this value, $\phi k$, is provided to the other input. At the same time that the current divisor $DP_0P_1 \ldots P_{k-1}$ is entered into the register 21, it is also right-shifted via 33, 40 and entered into the register 34. Thus, at pipeline clock period m+1, the two partial products representing the multiplication of $DP_0P_1 \ldots P_{k-1}k$ are entered in the registers 30 and 32. At the same time, the multiplexer 38 selects the contents of the register 34 and the adder 35 combines the contents of the registers 30, 32, and 34 to produce the updated divisor $DPOP1 \ldots Pk$. In cycle period m+1, the updated dividend $NPOP1 \ldots Pk-1$ is entered into the non-inverting register 21 and is entered, right-shifted, into the register 37. The value $\phi k$ continues to be provided through 22, 28. Now, in clock period m+2, the updated divisor $DP_0P_1 \ldots P_k$ is written to the result register 39. At the same time, the partial products representing $NP_0P_1 \ldots P_{k-1}\phi_k$ and the right-shifted term $NP_0P_1 \ldots P_{k-1}2^{-(n-1)}$ are fed from the registers 30, 32, and from the register 37 via the multiplexer 38 to the adder 35. In the following period, period m+3, the updated dividend $NP_0P_1 \ldots P_k$ is written to the result register 39.

The inventors also contemplate that two apparatuses, each corresponding to the embodiment illustrated in FIG. 4 could be operated in parallel, one for calculation of the updated divisor, the other for calculation of the updated quotient, with provision of the updated divisor from one unit being fed back to its own inverting and non-inverting registers and also to the inverting register of the unit for calculating the updated quotient.

It will be appreciated that the implementation of FIG. 4 is not the only possible embodiment of the invention and that the hardware organization may be modified to fit the implementation in a given technology. For example, depending on technology, the invert operand may not be needed or the normalizer may be already necessary for other arithmetic hardware operations, etc. In the implementation of FIG. 4, the following hardware would be required: the normalizer 18 (in general, needed for the convergence division algorithm), the register 37, a CSA adder for the extra 3/2 reduction, the inverters to produce the one's complement, and one extra input on the multiplexer in the operand register. It may be observed that there are bypassing buses that for a pipelined machine most likely already exist for fast multiplications. The hardware organization indicates that the additional hardware for the production of fast division cannot be considered prohibitive considering the amount of hardware needed to design two cycle multipliers. Also, considering the amount of hardware required to produce the same speed division using add-/subtract algorithms, it can be stated that the extra hardware is negligible.

As discussed, a preferred implementation of the proposed divider requires a 3/2 adder, inverting logic and possibly an extra register whereas the prior art algorithm described above will require a dedicated two's complementer. It will be appreciated that the extra logic required by the proposed divider is less expensive than the dedicated adder. It can of course be stated that an existing adder may be used to accomplish the two's complementations required by the prior art algorithm. However, multiplexing logic must be added to the adder and penalties will result in moving and adding for two's complementation because, in general, floating point adders require more than one cycle to implement an addition if not pipelined. That is because the two's complementations are not one after the other, (the two's complementation is required to be performed on the result of a multiplication, i.e. a data interlock exists between the multiplication and the two's complementation). No extra cycles are necessary with the usage of a dedicated two's complementer.

Accordingly, there has been disclosed a quadratic convergence divider which, when compared to the reported prior art divider, will result in savings in execution time and will be less expensive in cell count. Although various aspects and embodiments have been shown, it should be apparent that many other modifications will occur to persons skilled in the art, and the invention, therefore, is not to be limited except in accordance with the spirit of the appended claims and their equivalents.

APPENDIX A: TWO'S COMPLEMENT PROOF

If $y+y'=2$, then $y'$ is the two's complement of y. Let y be the decimal value associated with a binary string of length n enumerated from 0 to $n-1$. Let the string represent a fraction $y_0 y_1 \ldots y_{n-1}$ then:

$$y = \sum_{0}^{n-1} y_i 2^{-i}$$

$$= y_0 - \sum_{1}^{n-1} y_i 2^{-i}$$

Let $y'$ be the two's complement representation of y. Then $y'$ can be produced by inverting all elements of y and adding a 1. Thus, the decimal value associated with $y'$ is:

$$y' = \sum_{0}^{n-1} (1 - y_i) 2^{-i} + 2^{-(n-1)}$$

$$= \sum_{1}^{n-1} 2^{-i} + (1 - y_0) - 2^{-(n-1)} - \sum_{1}^{n-1} y_i 2^{-i}$$

Thus $$y + y' = y_0 + \sum_{1}^{n-1} y_i 2^{-i} + \sum_{1}^{n-1} 2^{-i} +$$

$$(1 - y_0) - 2^{-(n-1)} - \sum_{1}^{n-1} y_i 2^{-i}$$

$$= 1 + \sum_{1}^{n-1} 2^{-i} - 2^{-(n-1)}$$

$$= 1 + (1 - 2^{-(n-1)}) + 2^{-(n-1)}$$

$$= 2$$

i.e., $y' = 2 - y$, implying that $y'$ is the two's complement of y.

APPENDIX B: ONE'S COMPLEMENT PROOF $y'$ is the one's complement of y, if $y + y' = 2 = 2 - 2^{-(n-1)}$ Let $y = \sum_{1}^{n-1} y_i 2^{-i}$ then the one's complement $$y' = \sum_{0}^{n-1} (1 - y_i) 2^{-i}$$

$$y + y' = y_0 + \sum_{1}^{n-1} y_i 2^{-i} + (1 - y_0) + \sum_{1}^{n-1} (1 - y_i) 2^{-i}$$

$$= 1 + \sum_{1}^{n-1} 2^{-i} = 2 - 2^{-(n-1)}$$

In essence, $y'$ is the one's complement of y if $y' = 2 - y - 2^{-(n-1)}$.

What is claimed is:

1. In a system for dividing a digital dividend operand N by a digital divisor operand D to obtain a quotient operand Q, an improved divider for dividing said dividend operand N by said divisor operand D with minimal execution time and hardware, comprising: response to D; and convergence factor calculating means for calculating an updated dividend value $NP_0P_1 \ldots P_m$ in response to D, N, and $DP_0P_1 \ldots P_m$;

wherein the product $P_0P_1 \ldots P_m$ has a magnitude such that $NP_pP_1 \ldots P_m$;

register means for storing divisor and dividend values in response to D and N, respectively, the register means having an input for receiving updated divisor and dividend values and an output for providing current divisor and dividend values; and convergence processing means having an input coupled to the output of the register means and an output coupled to the input of the register means for producing a sequence of updated divisor signals and updated dividend signals in response to a sequence of current divisor and dividend signals, in which:

each updated divisor signal of the sequence is followed by an updated divided signal;

each updated divisor signal has the form $DP_x$ and each updated dividend signal has the form $NP_xk$ is an integer with is equal to or greater than 0; and the updated divisor signals and updated dividend signals include the product $P_0P_1 \ldots P_m$ which has a value magnitude such that an updated divisor signal corresponds to a value $DP_0P_1 \ldots P_m$ which converges to 1 and is followed by an updated dividend value $NP_0P_1 \ldots P_m$ which converges to Q.

2. The improvement of claim 1 wherein the value $P_0P_1 \ldots P_m$ is the product of a series of values $P_k$ for $0 \leq k \leq m$ and $DP_0P_1 \ldots P_k = K_{k-1}P_k$, $P_k$ being of the form $\phi k + 2^{-(n-1)}$, wherein $\phi_k$ is the one's complement of $D_{k-1}$ and n is the bit length of the operands N and D.

3. The improvement of claim 2 wherein said convergence processing means is for producing a series of products $(NP_0), (NP_0P_1) \ldots (NP_{01} \ldots P_m)$.

4. The improvement of claim 3 wherein said convergence processing means produces each product of said series of products $(NP_0), (NP_0P_1) \ldots (NP_0P_1 \ldots P_m)$ following determination of each product of a series of products $(DP_0) (DP_0DP_1) \ldots DP_0P_1 \ldots P_m$.

5. In a system for dividing a digital dividend operand N by a digital divisor operand D to obtain a quotient open and Q, an improvement for dividing said dividend operand N by said divider operand D, the combination comprising:

divisor means of providing a divisor signal representing a value $DP_0P_1 \ldots P_{k-1}$;

complement means connected to the divisor means for providing a complement signal $\phi_k$ representing the one's complement of the value $DP_0P_1 \ldots P_{k-1}$;

quotient convergence means for providing a quotient signal representing a quotient convergence value $NP_0P_1 \ldots P_{k-1}$;

multiplication means connected to the complement means and quotient convergence means for producing two partial product signals, each partial product signal representing a respective partial product of a value $NP_0P_1 \ldots P_{k-1}\phi k$ in response to the complement and quotient convergence signals;

shift means connected to the quotient convergence means for providing a shift signal representing a shift value $NP_0P_1 \ldots P_{k-1}2^{-(n-1)}$, where (n-1) is a value representing the place number of the least significant bits of operands D and N; and addition means connected to the multiplication means and to the shaft mean for generating a quotient signal representing Q by adding the values represented by the two partial product signals and the shift signal, where $Q = NP_0P_1 \ldots P_m$.

6. The combination of claim 5, wherein the addition means includes a carry-save adder connected to the multiplication means and to the shift means, which produces carry and save signals in response to the two partial product and the shift signals, and a carry lookahead adder connected to the carry save adder, which produces the quotient signal in response to the carry and save signals.

7. In a digital computer system including register means for temporary storage of divisor and dividend terms, shifting means for shifting divisor and dividend terms in a predetermined direction, multiplier means which produce two partial product signals and three-to-one adder means which produce a sum in response to three operands, a method for dividing a digital dividend N by a digital divisor D to produce a digital a digital Q, the dividend and divisor being normalized, multi-bit numbers with n bits, n-1 bits following a binary point in each number, the method comprising the steps of:

storing a current divisor $DP_0P_1 \ldots P_{k-1}$ and the one's complement, $\phi_k$, of the current divisor in the register means;

generating two partial product signals at the multiplication means in response to the current divisor and its one's complement, the two partial product signals representing $DP_0P_1 \ldots P_{k-1} 0k$;

right-shifting the current divisor to produce a right-shifted divisor term $DP_0P_1 \ldots P_{k-1}2^{1(n-1)}$;

generating an updated divisor term $DP_0P_1 \ldots P_k$ at the three-to-one adder means in response to the two partial products and the right-shifted divisor term;

storing a current dividend term $DP_0P_1 \ldots P_{k-1}$ and the one's complement $\phi_k$ in the register means;

generating two partial product signals at the multiplier means in response to the current dividend term and the one's complement, the two partial product signals representing the product $DP_0P_1 \ldots P_{k-1}\phi_k$;

right-shifting the current dividend term to produce a right-shifted dividend term $DP_0P_1 \ldots P_{k-1}2^{-(n-1)}$; and producing an updated dividend term $DP_0P_1 \ldots P_k$ at the three-to-one adder means in response to the two partial products and the right-shifted term.

8. The method of claim 7, wherein the steps are repeated until the product $P_0P_1 \ldots P_k$ has a magnitude such that the updated dividend term converges to Q and the updated divisor term converges to 1.

* * * * *

UNITED STATES PATENT AND TRADEMARK OFFICE
CERTIFICATE OF CORRECTION

PATENT NO. : 5,140,545
DATED : August 18, 1992
INVENTOR(S) : Vassiliadis et al It is certified that error appears in the above-identified patent and that said Letters Patent is hereby corrected as shown below:

Column 13, line 11, please insert --, where--, immediately preceding "k";
  line 34, please change "$(DP_0\ DP_1)$" to --$(DP_0P_1)$-- and change "$DP_0P_1...P_m$" to --$(DP_0P_1...P_m)$--.

Column 14, line 33, please change "$DP_0P_1...P_{k-1 0K}$" to --$DP_0P_1...P_{k-1}\emptyset_k$--; and lines 40, 45, 48, and 50, please change each occurrence of "D" to --N--.

Column 12, lines 57-63, please delete "response to D; and convergence factor calculating means for calculating an updated dividend value $NP_0P_1...P_m$ in response to D, N, and $DP_0P_1...P_m$; wherein the produce $P_0P^1...P_m$ has a magnitude such that $NP_pP_1...P_m$;".

Column 13, line 10, change "$DP_x$" to --$DP_k$--; line 11, change "$NP_x$" to --$NP_k$--; line 12, change "with" to --which--; line 25, change "$2^{-(n-1)}$" to --$2^{-(n-1)}$--; and line 37, change "open and" to --operand--.

Column 14, line 35, change "$2^{1(n-1)}$" to --$2^{-(n-1)}$--.

Signed and Sealed this

Thirtieth Day of November, 1993

Attest:

BRUCE LEHMAN

*Attesting Officer*          Commissioner of Patents and Trademarks